(12) United States Patent
Raichelgauz

(10) Patent No.: US 12,505,172 B1
(45) Date of Patent: Dec. 23, 2025

(54) AUTOMATICALLY IDENTIFYING FAULTY REPRESENTATIONS ACROSS CLASSIFICATION DETECTIONS

(71) Applicant: AUTOBRAINS TECHNOLOGIES LTD, Tel Aviv-Jaffa (IL)

(72) Inventor: Igal Raichelgauz, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 0 days.

(21) Appl. No.: 18/808,086

(22) Filed: Aug. 19, 2024

(51) Int. Cl.
*G06F 18/24* (2023.01)

(52) U.S. Cl.
CPC ................................ *G06F 18/24* (2023.01)

(58) Field of Classification Search
CPC ..................................................... G06F 18/24
See application file for complete search history.

(56) References Cited

U.S. PATENT DOCUMENTS

| | | | | |
|---|---|---|---|---|
| 2013/0307981 | A1* | 11/2013 | Jang ................... | G08G 1/015 348/148 |
| 2022/0044149 | A1* | 2/2022 | Rand .................. | G06V 10/7747 |
| 2024/0212319 | A1* | 6/2024 | Verbeke ............... | G06V 20/70 |
| 2025/0003768 | A1* | 1/2025 | Pullagurla ........... | G01C 21/3859 |

OTHER PUBLICATIONS

Akanksh Basavaraju et al., "A Machine Learning Approach to Road Surface Anomaly Assessment Using Smartphone Sensors", IEEE Sensors Journal, vol. 20, No. 5, Mar. 1, 2020 (Year: 2020).*

* cited by examiner

*Primary Examiner* — Jared M Bibbee
(74) *Attorney, Agent, or Firm* — RECHES PATENTS

(57) ABSTRACT

A method of automatically identifying faulty representations across far-near classification detections, the method includes continuously obtaining, across a specified period of time, classification decisions for a road element, where the road element is trackable by using at least one sensing unit across the specified period of time and across a range of distances from the at least one sensing unit, automatically searching, by a machine learning process, for a discrepancy between classification decisions made at different distances of the range of distances; determining in real time, based on an outcome of the automatically searching whether the detections made with respect to the road element are faulty; and providing a faulty representation indication with respect to the classification decisions for the road element.

14 Claims, 4 Drawing Sheets

AUTOMATICALLY IDENTIFYING FAULTY REPRESENTATIONS ACROSS CLASSIFICATION DETECTIONS

BACKGROUND

Autonomous vehicle and vehicles that are equipped with advanced driver assistance systems (ADAS) are required to accurately classify road elements.

There is a growing need to improve the accuracy of the classification.

SUMMARY

A method, system and non-transitory computer readable medium as illustrated in the application.

A BRIEF DESCRIPTION OF THE DRAWINGS

The embodiments of the disclosure will be understood and appreciated more fully from the following detailed description, taken in conjunction with the drawings in which.

DETAILED DESCRIPTION

The different figures illustrates examples of units and/or software and/or information items and/or steps and/or components. These examples are provided for brevity of explanation. At least one of the units and/or software and/or information items and/or steps and/or components is optional or mandatory.

There is provided a solution that automatically identifying faulty representations across classification detections.

The automatic identification is much cheaper than manually tagging classification decisions as faulty.

The automatic classification uses classification decisions that were made based on sensed information units that were taken by the same sensing unit-thereby increasing the accuracy of the automatic classification.

The automatic classification is based on sensed information units taken during driving and does not require dedicated resources for acquiring dedicated sensed information units.

Figure 1:
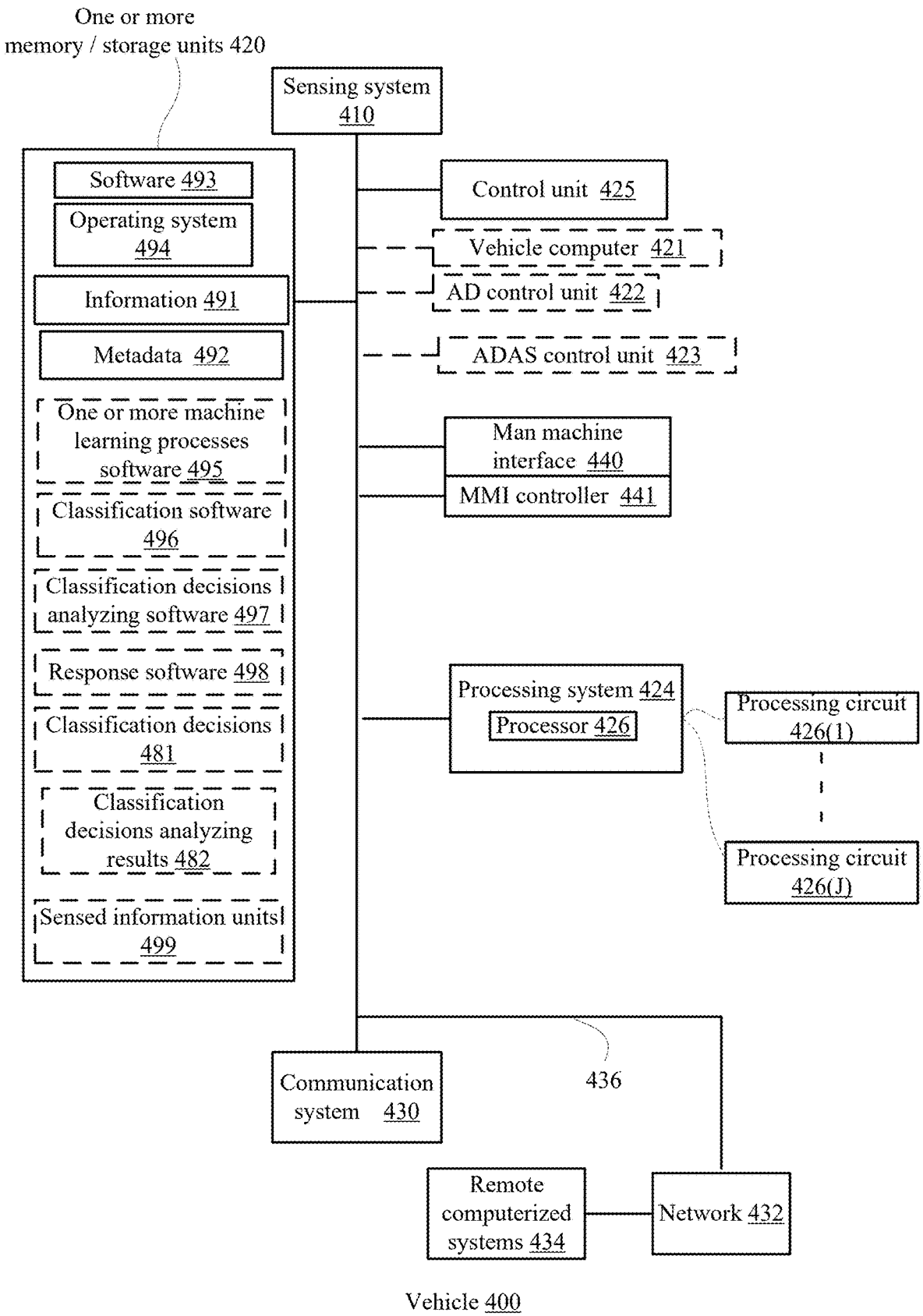
FIG. 1 illustrates an example of a vehicle.

FIG. 1 illustrates an example of a vehicle 400.

Vehicle 400 includes a man machine interface 440 having or being in communication with man machine interface (MMI) controller 441, a communication system 430, one or more memory and/or storage units 420, a processing system 424 including processor 426. The communication system 430, the one or more memory and/or storage units 420, and the processing system 424 may belong to a computerized system of vehicle 400. The computerized system may be a server, a laptop, a desktop or any other computer and may include or be in communication with a sensing unit and/or a controller.

According to an embodiment, vehicle 400 is in communication with network 432 and one or more other remote computerized systems 434a that are in communication with network 432. An example of a remote computerized system is a server or one or more computers having access to a storage system that stores items related to one or more portions of one or more groups of neural networks—at least some of which are not currently stored in the vehicle.

According to an embodiment, the communication system 430 is configured to enable communication between the one or more memory and/or storage units 420 and/or any one of the additional units and/or the network 432 (that is in communication with the remote computerized systems). Communication system 430 is also configured to enable communication with other elements such as sensing system 410, man machine interface 440, control unit 425, vehicle computer 421, autonomous driving control unit 422 (denoted AD control unit), advanced driver assistance system (ADAS) control unit 423 (denoted ADAS control unit), and the like.

The memory and/or storage units 420 was shown as storing software. Any reference to software should be applied mutatis mutandis to code and/or firmware and/or instructions and/or commands, and the like.

Processor 426 includes a plurality of processing units 426(1)-426(J), J is an integer that exceeds one. Any reference to one unit or item should be applied mutatis mutandis to multiple units or items. For example—any reference to processor should be applied mutatis mutandis to multiple processors, any reference to communication system 430 should be applied mutatis mutandis to multiple communication systems.

According to an embodiment, the one or more memory and/or storage units 420 includes one or more memory unit, each memory unit may include one or more memory banks.

According to an embodiment, the one or more memory and/or storage units 420 includes a volatile memory and/or a non-volatile memory. The one or more memory and/or storage units 420 may be a random-access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle. For example, and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any content may be stored in any part or any type of the memory and/or storage units.

According to an embodiment, the at least one memory unit stores at least one database—such as any database known in the art—such as DB2®, Microsoft® Access, Microsoft® SQL Server, Oracle®, mySQL, PostgreSQL, and the like.

The memory and/or storage units 420 are configured to store firmware and/or software, one or more operating systems, data and metadata required to the execution of any of the methods mentioned in this application.

The memory and/or storage units 420 was shown as storing software. Any reference to software should be applied mutatis mutandis to code and/or firmware and/or instructions and/or commands, and the like.

Various units and/or components are in communication with each other using any communication elements and/or protocols. An example of a communication system is denoted 430. Other communication elements may be provided.

The communication system 430 may be in communication with bus 436. The bus represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus, and all buses specified in this description can also be implemented over a wired or wireless network connection and each of the subsystems.

Network 432 that is located outside the vehicle and is used for communication between the vehicle and at least one remote computing system. By way of example, a remote computing system can be a personal computer, a laptop computer, portable computer, a server, a router, a network computer, a peer device or other common network node, and so on. Logical connections between the processor and either one of remote computing systems can be made via a local area network (LAN) and a general wide area network (WAN). Such network connections can be through a network adapter (may belong to communication system 430) which can be implemented in both wired and wireless environments. Such networking environments are conventional and commonplace in offices, enterprise-wide computer networks, intranets, and a larger network such as the internet.

It should be noted that at least a part of the content illustrated as being stored in one or more memory/storage units 420 may be stored outside the vehicle. It should also be noted that the processor may evaluate signatures generated by a plurality of detectors.

According to an embodiment, the memory and/or storage units 420 stores at least one of: operating system 494, information 491 such as sensed information units 499, metadata 492, and software 493.

Examples of software includes:
A. One or more machine learning processes software 495.
B. Classification software 496.
C. Classification decisions analyzing software 497.
D. Response software 498.

It should be noted that the one or more machine learning processes software 495 may replace the classification software 496 and/or the classification decisions analyzing software 497.

FIG. 1 also illustrates information and/or metadata such as:
A. Sensed information units 499.
B. Classification decisions 481.
C. Classification decision analysis results 482.

The control unit 425 may cooperate with ADAS control unit 423 and/or with AD control unit 422 and/or may control or communicate with other vehicle components-including vehicle computer The ADAS control unit 423 is configured to control ADAS operations.

The AD control unit 422 is configured to control autonomous driving of the autonomous vehicle.

The vehicle computer 421 is configured to control the operation of the vehicle-especially controlling the engine, the transmission, and any other vehicle system or component.

The vehicle computer 421 may be in communication with an engine control module, a transmission control module, a powertrain control module, and the like.

The sensing system 410 may include optics, a sensing element group, a readout circuit, and an image signal processor. Optics are followed by a sensing element group such as line of sensing elements or an array of sensing elements that form the sensing element group. The sensing element group is followed by a readout circuit that reads detection signals generated by the sensing element group. An image signal processor is configured to perform an initial processing of the detection signals—for example by improving the quality of the detection information, performing noise reduction, and the like. The sensing system 410 is configured to output one or more sensed information units (SIUs).

Control unit 425 is configured to control the operation of the sensing system 410, and/or the one or more memory and/or storage units 420 and/or the one or more additional units (except the controller).

By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by a computer.

Any content may be stored in any part or any type of memory and/or storage units.

According to an embodiment, at least one memory unit stores at least one database-such as any database known in the art-such as DB2®, Microsoft® Access, Microsoft® SQL Server, Oracle®, mySQL, PostgreSQL, and the like.

Various units and/or components are in communication with each other using any communication elements and/or protocols. An example of a communication system is denoted 430. Other communication elements may be provided.

According to an embodiment, processing system 424 is configured to perform, while executing software:
A. Continuously obtain, across a specified period of time, classification decisions for a road element, where the road element is trackable by using at least one sensing unit across the specified period of time and across a range of distances from the at least one sensing unit. The classification decisions reflect detections made with respect to the road element across the range of distances from the at least one sensing unit.
B. Automatically search, by a machine learning process, for a discrepancy between classification decisions made at different distances of the range of distances
C. Determine in real time, based on an outcome of the automatically searching whether the detections made with respect to the road element are faulty.
D. Respond to the faulty representation—for example provide a faulty representation indication with respect to the classification decisions for the road element, add the faulty classification decision to blacklist or other data structure of faulty classification decisions, use the faulty classification decision to train another machine learning process, store the faulty classification decision, transmit the faulty classification decision.

E. When a correct classification is found—the responding may include at least one of providing a correct representation indication with respect to the classification decisions for the road element, add the correct classification decision to a white list or other data structure of correct classification decisions, use the correct classification decision to train another machine learning process, store the correct classification decision, transmit the correct classification decision, and the like.

Any method illustrated in the application is executable by a processor and/or processing circuit (also referred to as a processing circuitry)—an example of which is illustrated in FIG. 1.

Figure 2:
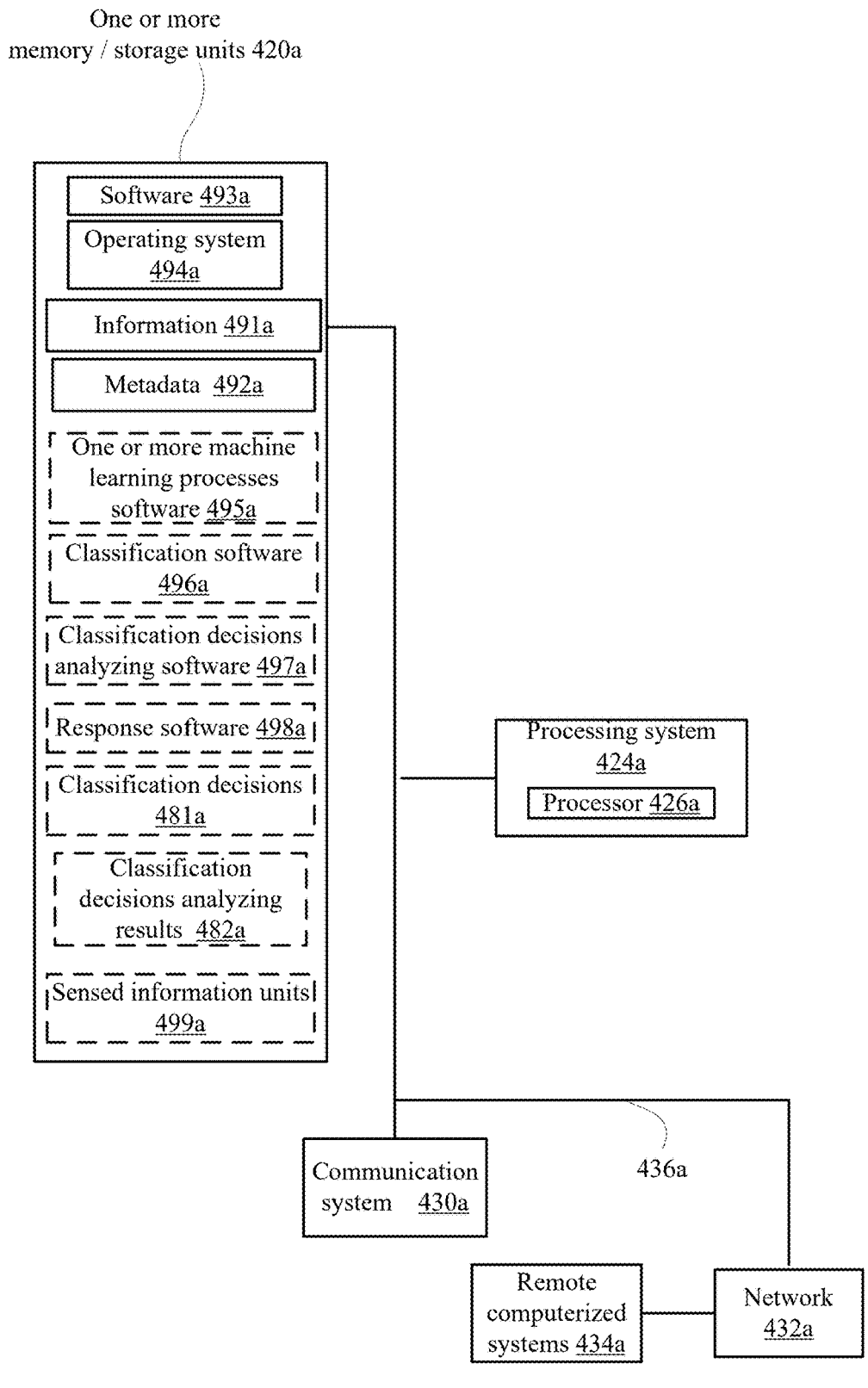
FIG. 2 illustrates an example of a computerized system.

FIG. 2 illustrated a computerized system 400a that includes processing system 424a including processor 426a, communication system 430a, bus 436a, network 432a, and one or more memory/storage units 420a.

The one or more memory/storage units 420a store software 493a, operating system 494a, information 491a, metadata 492a.

Examples of software includes:
  A. One or more machine learning processes software 495a.
  B. Classification software 496a.
  C. Classification decisions analyzing software 497a.
  D. Response software 498a.

It should be noted that the one or more machine learning processes software 495a may replace the classification software 496a and/or the classification decisions analyzing software 497a.

FIG. 2 also illustrates information and/or metadata such as:
  A. Sensed information units 499a.
  B. Classification decisions 481a.
  C. Classification decision analysis results 482a.

Figure 3:
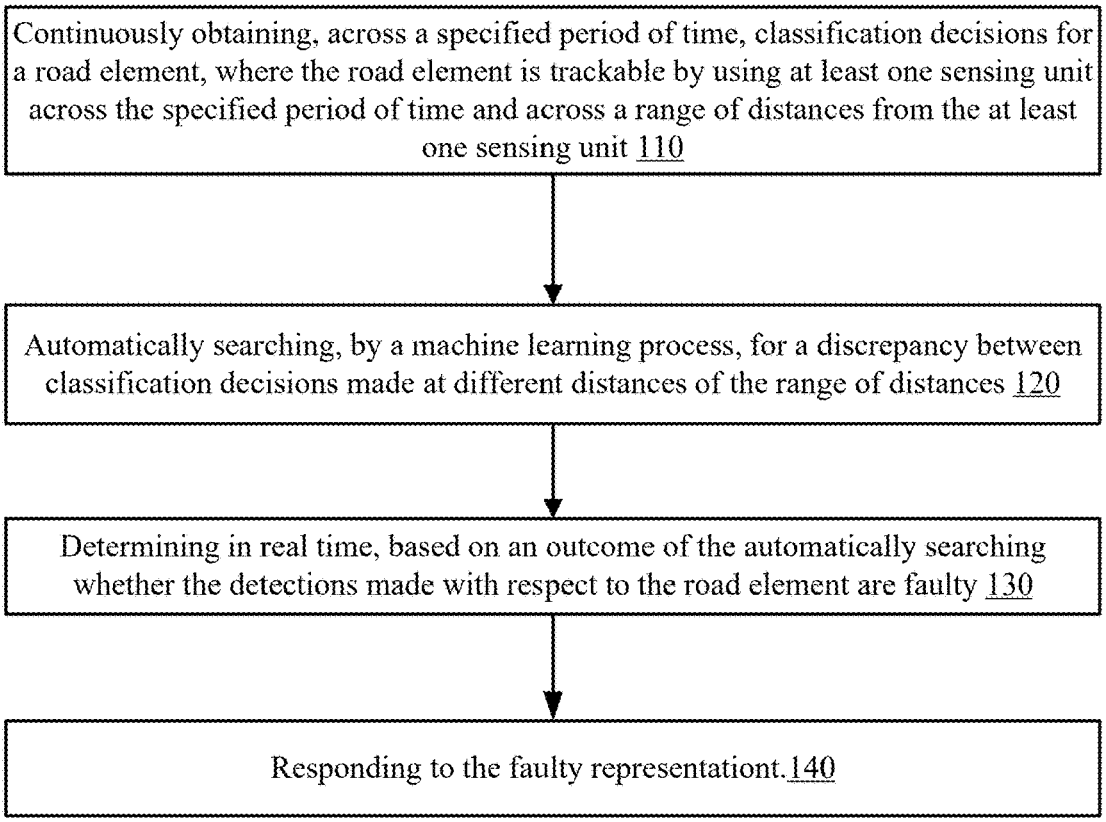
FIG. 3 illustrates an example of a method.

FIG. 3 illustrates an example of method 100 of automatically identifying faulty representations across classification detections.

According to an embodiment, method 100 starts by step 110 of continuously obtaining, across a specified period of time, classification decisions for a road element, where the road element is trackable by using at least one sensing unit across the specified period of time and across a range of distances from the at least one sensing unit. The classification decisions reflect detections made with respect to the road element across the range of distances from the at least one sensing unit.

According to an embodiment, the classification decisions are obtained in association with corresponding distances from the at least one sensing unit.

According to an embodiment, step 110 is followed by step 120 of automatically searching, by a machine learning process, for a discrepancy between classification decisions made at different distances of the range of distances.

Assuming that the classification decisions for the road element are related to a plurality of distances within the range of distances-then the searching may include checking all the classification decisions or only some of the classification decisions.

According to an embodiment, the discrepancy is checked between a maximal distance classification decision made when the road element is located at a maximal distance of the range of distances and a minimal distance classification decision made when the road element is located at a minimal distance of the range of distances.

According to an embodiment, the discrepancy is checked between a pair of classification decisions made when the road element is located at a pair of distances of the range of distances.

According to an embodiment, the discrepancy is checked between three or more classification decisions made when the road element is located at three or more distances of the range of distances.

According to an embodiment, different distances are associated with classification decisions of different confidence levels—and the discrepancy is checked between distances associated with different confidence levels.

According to an embodiment, step 120 is followed by step 130 of determining in real time, based on an outcome of the automatically searching whether the detections made with respect to the road element are faulty.

According to an embodiment, step 130 includes estimating which classification decision of the classification decisions is correct.

According to an embodiment, the estimating is based on a distance based classification accuracy metric.

According to an embodiment, the distance based classification accuracy metric is indicative of classification confidence levels per distance.

According to an embodiment, the classification accuracy is the highest when the road element appears in a sensed information unit (for example is captured by multiple pixels of an image) having a size that is within a first size range defined between a first minimal size and a first maximal size—for example between S1 by S2 pixels and S3 by S4 pixels, whereas S1 may equal S2 or may differ from S2, whereas S3 may equal S4 or may differ from S4. S1, S2, S3 and S4 may be of any value—for example S1 and S2 may range between 10 and 30 while S3 and S4 may range between 70 and 150, yet for another example S1 by S2 may range between 30 to 150 while S3 by S4 exceeds S1 by S2 and may range between 200 and 2000.

According to an embodiment, when the size of the road element is too small to be included in the first size range—and as this size is smaller—the confidence level decreases.

Assuming a road element of a given size (for example a private car)—the distance between the road element and the sensing unit translates to a size difference within the image.

According to an embodiment, the classification accuracy is impacted by limitations of the sensing unit itself—for example optical or digital zoom limitations, signal to noise ratio, optical aberrations and the like—and it can be estimated or measured to provide the distance based classification accuracy metric.

According to an embodiment, the classification accuracy is impacted by limitations of a classification process used to perform the classification of the road element—for example—a machine learning process or any other process used for analyzing the sensed information unit to provide a classification decision—and it can be estimated or measured to provide the distance based classification accuracy metric.

According to an embodiment, the estimating is based solely on the confidence level—and selecting the classification decision of a lower confidence level that contradicts a classification decision of a higher confidence level as faulty.

According to an embodiment, the estimating is based on the distribution of the classification decisions—for example selecting the less frequent classification decision as a faulty classification decision.

According to an embodiment, the estimating is based on both the confidence level and the distribution of the classification decisions—for example selecting the less frequent classification decision as a faulty classification decision is it also exhibits a lower confidence level.

According to an embodiment, step 130 is followed by step 140 of responding to the faulty representation—for example providing a faulty representation indication with respect to the classification decisions for the road element, adding the faulty classification decision to black list or other data structure of faulty classification decisions, using the faulty classification decision to train another machine learning process, storing the faulty classification decision, transmitting the faulty classification decision.

When a correct classification is found—the responding may include at least one of providing a correct representation indication with respect to the classification decisions for the road element, adding the correct classification decision to a white list or other data structure of correct classification decisions, using the correct classification decision to train another machine learning process, storing the correct classification decision, transmitting the correct classification decision, and the like.

Figure 4:
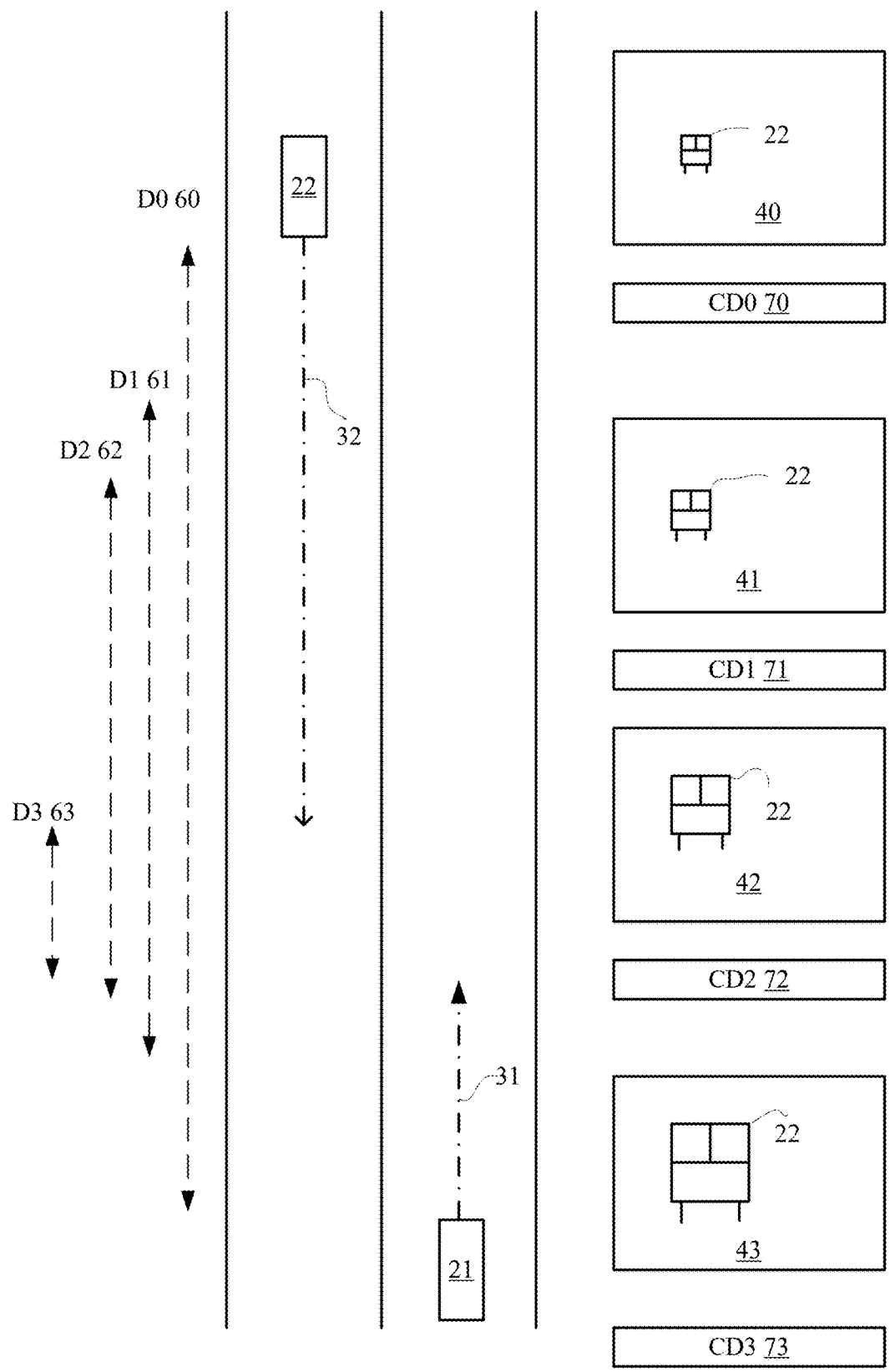
FIG. 4 illustrates an example of a images, classification decisions and vehicles.

FIG. 4 illustrates an example of ego vehicle 21 following first vehicle path 32, and a second vehicle 22 following a second vehicle path 32, four images 40, 41, 42 and 43 taken at first, second, third and fourth distances between the vehicles (DO 60, D1 61, D2 62 and D3 63), and four classification decisions CD0 70, CD1 71, CD2 72 and CD3 73 taken at the four distances.

Assuming that the four classification decisions are the same (vehicle)—then these classification decisions are deemed to be correct.

Assuming that CD0 classify the second vehicle as a pedestrian and that CD1, CD2 and CD3 classify the second vehicle as a vehicle—then CD0 is deemed to be faulty.

In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarding the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one unit or module described herein, may be implemented in hardware and/or code, instructions and/or commands stored in a non-transitory computer readable medium, may be included in a vehicle, outside a vehicle, in a mobile device, in a server, and the like.

The vehicle may be any type of vehicle-such as a ground transportation vehicle, an airborne vehicle, or a water vessel.

The specification and/or drawings may refer to an image. An image is an example of sensed information. Any reference to an image may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. Any reference to a media unit may be applied mutatis mutandis to sensed information. The sensed information may be of any kind and may be sensed by any type of sensors-such as a visual light camera, an audio sensor, a sensor that may sense infrared, radar imagery, ultrasound, electro-optics, radiography, LIDAR (light detection and ranging), etc. The sensing may include generating samples (for example, pixel, audio signals) that represent the signal that was transmitted, or otherwise reach the sensor.

The specification and/or drawings may refer to a processor. The processor may be a processing circuitry (also referred to as a processing circuit). The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Any reference to an object may be applicable to a pattern. Accordingly-any reference to object detection is applicable mutatis mutandis to a pattern detection.

A situation may be a singular location, or optionally a combination of properties identified at a specified point in time. A scenario is a series of events that follow logically within a causal frame of reference. Any reference to a scenario should be applied mutatis mutandis to a situation.

The sensed information unit may be sensed by one or more sensors of one or more types. The one or more sensors may belong to the same device or system—or may belong to different devices of systems.

I claim:

1. A method of automatically identifying faulty representations across classification detections, the method comprising:
continuously obtaining, across a specified period of time, classification decisions for a road element, where the road element is trackable by using at least one sensing unit across the specified period of time and across a range of distances from the at least one sensing unit, such that the classification decisions reflect detections made with respect to the road element across the range of distances from the at least one sensing unit;
automatically searching, by a machine learning process, for a discrepancy between two or more classification decisions made when the road element is located at two or more different distances of the range of distances;
determining in real time, based on an outcome of the automatically searching whether the detections made with respect to the road element are faulty; and
providing a faulty representation indication with respect to the classification decisions for the road element.

2. The method according to claim 1, wherein the classification decisions are obtained in association with corresponding distances from the at least one sensing unit.

3. The method according to claim 1, further comprising estimating which classification decision of the classification decisions is correct.

4. The method according to claim 3, wherein the estimating is based on a distance based classification accuracy metric.

5. The method according to claim 4, wherein the distance based classification accuracy metric is indicative of classification confidence levels per distance.

6. The method according to claim 1, wherein the two or more classification decisions comprise (a) a maximal distance classification decision made when the road element is located at a maximal distance of the range of distances and (b) a minimal distance classification decision made when the road element is located at a minimal distance of the range of distances.

7. A non-transitory computer readable medium containing instructions that when executed by at least one processor, cause the at least one processor to:
continuously obtain, across a specified period of time, classification decisions for a road element, where the road element is trackable by using at least one sensing unit across the specified period of time and across a range of distances from the at least one sensing unit, such that the classification decisions reflect detections made with respect to the road element across the range of distances from the at least one sensing unit;
automatically search, by a machine learning process, for a discrepancy between two or more classification decisions made when the road element is located at two or more different distances of the range of distances;
determine in real time, based on an outcome of the automatically searching whether the detections made with respect to the road element are faulty; and
provide a faulty representation indication with respect to the classification decisions for the road element.

8. The non-transitory computer readable medium according to claim 7, wherein the classification decisions are obtained in association with corresponding distances from the at least one sensing unit.

9. The non-transitory computer readable medium according to claim 7, further containing instructions that when executed by the at least one processor, cause the at least one processor to estimate which classification decision of the classification decisions is correct.

10. The non-transitory computer readable medium according to claim 9, wherein the estimating is based on a distance based classification accuracy metric.

11. The non-transitory computer readable medium according to claim 10, wherein the distance based classification accuracy metric is indicative of classification confidence levels per distance.

12. The non-transitory computer readable medium according to claim 7, wherein the two or more classification decisions comprise (a) a maximal distance classification decision made when the road element is located at a maximal distance of the range of distances and (b) a minimal distance classification decision made when the road element is located at a minimal distance of the range of distances.

13. A system of automatically identifying faulty representations, the system comprising; at least one processing device comprising circuitry and a memory, wherein the memory includes instructions that when executed by the circuitry cause the at least one processor to:
continuously obtain, across a specified period of time, classification decisions for a road element, where the road element is trackable by using at least one sensing unit across the specified period of time and across a range of distances from the at least one sensing unit, such that the classification decisions reflect detections made with respect to the road element across the range of distances from the at least one sensing unit;
automatically search, by a machine learning process, for a discrepancy between two or more classification decisions made when the road element is located at two or more different distances of the range of distances;
determine in real time, based on an outcome of the automatically searching whether the detections made with respect to the road element are faulty; and
provide a faulty representation indication with respect to the classification decisions for the road element.

14. The system according to claim 13, wherein the two or more classification decisions comprise (a) a maximal distance classification decision made when the road element is located at a maximal distance of the range of distances and (b) a minimal distance classification decision made when the road element is located at a minimal distance of the range of distances.

* * * * *